(12) United States Patent
Shi

(10) Patent No.: US 12,414,160 B2
(45) Date of Patent: Sep. 9, 2025

(54) 2-STEP RANDOM ACCESS METHOD AND APPARATUS, TERMINAL AND STORAGE MEDIUM

(71) Applicant: GUANGDONG OPPO MOBILE TELECOMMUNICATIONS CORP., LTD., Dongguan (CN)

(72) Inventor: Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 586 days.

(21) Appl. No.: 17/562,555

(22) Filed: Dec. 27, 2021

(65) Prior Publication Data
US 2022/0124825 A1  Apr. 21, 2022

Related U.S. Application Data

(63) Continuation of application No. PCT/CN2019/100872, filed on Aug. 15, 2019.

(51) Int. Cl.
H04W 74/0836 (2024.01)
H04W 74/0833 (2024.01)

(52) U.S. Cl.
CPC .... *H04W 74/0836* (2024.01); *H04W 74/0833* (2013.01)

(58) Field of Classification Search
CPC ................................................ H04W 74/0833
See application file for complete search history.

(56) References Cited

U.S. PATENT DOCUMENTS

2009/0316593 A1 * 12/2009 Wang ................ H04W 74/0833
370/252
2018/0139653 A1   5/2018 Lee et al.
(Continued)

FOREIGN PATENT DOCUMENTS

CN       108282899 A       7/2018
CN       108282901 A       7/2018
(Continued)

OTHER PUBLICATIONS

Examination report dated Feb. 10, 2023 received in European Patent pipton No. EP19941697.5.
(Continued)

*Primary Examiner* — Ayman A Abaza
*Assistant Examiner* — Camquyen Thai
(74) *Attorney, Agent, or Firm* — Sheppard, Mullin, Richter & Hampton LLP

(57) ABSTRACT

The present disclosure discloses a 2-step random access method and apparatus, a device, and a medium, and relates to a field of wireless communication. The method includes: transmitting a message A, when a 2-step random access is triggered based on a trigger event, the message A carrying a Cell-Radio Network Temporary Identifier (C-RNTI) of a User Equipment (UE); receiving a message B; and determining that a conflict of the 2-step random access is resolved, when the message B satisfies a condition corresponding to the trigger event. The present disclosure may determine, based on whether the message B satisfies the condition corresponding to a trigger event, whether a conflict on a 2-step random access channel is resolved.

12 Claims, 10 Drawing Sheets

(56) References Cited

U.S. PATENT DOCUMENTS

| | | | |
|---|---|---|---|
| 2018/0270869 A1 | 9/2018 | Tsai | |
| 2018/0368167 A1 | 12/2018 | Kim et al. | |
| 2019/0075593 A1 | 3/2019 | Mauritz | |
| 2020/0221508 A1* | 7/2020 | Huang | H04W 74/006 |
| 2020/0351949 A1* | 11/2020 | Turtinen | H04W 74/0833 |
| 2022/0015155 A1* | 1/2022 | Lu | H04W 24/08 |
| 2022/0232623 A1* | 7/2022 | Lee | H04W 72/23 |

FOREIGN PATENT DOCUMENTS

| | | |
|---|---|---|
| CN | 109392189 A | 2/2019 |
| CN | 109495975 A | 3/2019 |
| CN | 109983829 A | 7/2019 |
| EP | 3525516 A1 | 8/2019 |
| WO | 2018127244 A1 | 7/2018 |
| WO | 2019137368 A1 | 7/2019 |
| WO | 2020196614 A1 | 10/2020 |

OTHER PUBLICATIONS

International Search Report and Written Opinion dated May 13, 2020 in International Application No. PCT/CN2019/100872. English translation is attached.
OPPO. "MsgB contents and formats in 2-step RACH", 3GPP TSG RAN WG2 Meeting #106 R2-1905600, May 17, 2019 (May 17, 2019), Section 1-3.
OPPO. "Contention resolution for 2-step RACH", 3GPP TSG RAN WG2 Meeting #106 R2-1905596, May 17, 2019 (May 17, 2019), Section 2.
CATT. "2- step RACH procedure", 3GPP TSG RAN2 Meeting #106 R2-1905753, May 17, 2019 (May 17, 2019), Sections 1-3.
Notice of Reasons for Rejection dated Jun. 20, 2023 received in Japanese Patent Application No. JP 2021-578087. English translation attached.
Huawei, HiSilicon, Discussion on the contention resolution for 2-step RACH[online], 3GPP TSG RAN WG2 #106 R2-19xxxxx, URL:https://www.3gpp.org/ftp/tsg_ran/WG2_RL2/TSGR2_106/Docs/R2-1907728.zip, May 2019 (May 2019), 2 pages.
3GPP, 3rd Generation Partnership Project; Technical Specification Gr oup Radio Access Network; NR; Medium Access Control (MAC) protocol speci fication (Release 15)[online], 3GPP TS 38.321 V15.6.0 (Jun. 2019), https://www.3gpp.org/ftp/Specs/archive/38_series/38.321/38321-f60.zip, Jun. 2019 (Jun. 2019), p. 1, pp. 32-34, 78 pages.
Email Discussion Rapporteur (ZTE), Procedures and mgsB content [105bis#30][NR/2-step RACH][online], 3GPP TSG RAN WG2 #106 R2-1906308, https://www.3gpp.org/ftp/tsg_ran/WG2_RL2/TSGR2_106/Docs/R2-1906308.zip, May 2019 (May 2019), 91 pages.
OPPO, Contention resolution for C-RNTI included in msgA,3GPP TSG RAN WG2 #107 R2-1908769, URL:https://www.3gpp.org/ftp/tsg_ran/WG2_RL2/TSGR2_107/Docs/R2-1908769.zip, Aug. 2019 (Aug. 2019), 4 pages.
Nokia, Nokia Shanghai Bell, Feature lead summary#3 on 2 step RACH procedures, 3GPP TSG RAN WG1 #97 , R1-1907900, URL:https://www.3gpp.org/ftp/tsg_ran/WG1_RL1/TSGR1_97/Docs/R1-1907900.zip, May 2019 (May 2019), 59 pages.
The Grant Notice from corresponding Chinese Application No. 202210215307.8, dated May 22, 2023. English translation attached.
First Examination Report dated May 27, 2022 received in India Patent Application No. IN 202127061520.
Extended European Search Report dated May 20, 2022 received in European Patent Application No. EP 19941697.5.
First Office Action from corresponding Chinese Application No. 202210215307.8, dated Feb. 25, 2023. English translation attached.
Grant Notice dated Nov. 30, 2023 received in European Patent Application No. EP19941697.5.
Spreadtrum Communications, Considerations on 2-step RACH procedure[online], 3GPP TSG RAN WG1 #97 R1-1906367, May 2, 2019.
Samsung, Procedure for Two-step RACH[online], 3GPP TSG RAN WG1 #97 R1-1906906, May 3, 2019.
Notice of Reasons for Refusal mailed Oct. 24, 2023 for Japanese Application No. 2021-578087. English translation included.
Hearing Notice dated Aug. 22, 2024 received in Indian Patent Application No. IN 202127061520. English translation attached.
Japanese Rejection Decision with English Translation for JP Application 2021-578087 mailed Apr. 16, 2024.
First Office Action of the Korean application No. 10-2021-7042494, issued on May 16, 2025, 12 pages with English translation.

* cited by examiner

2-STEP RANDOM ACCESS METHOD AND APPARATUS, TERMINAL AND STORAGE MEDIUM

The present application is a continuation of International Application No. PCT/CN2019/100872, filed on Aug. 15, 2019, the content of which is incorporated herein by reference in its entireties.

TECHNICAL FIELD

The present disclosure relates to a field of mobile communication, and more particularly, to a 2-step random access method and apparatus, a terminal and a storage medium.

BACKGROUND

A Random Access Channel (RACH) is an important channel in an initial access process between an access network device and a User Equipment (UE). Long-Term Evolution (LTE) adopts a contention-based 4-step random access mechanism, which will be simplified to a contention-based 2-step random access mechanism in some usage scenarios of a New Radio (NR) system.

Regarding the contention-based 2-step random access mechanism, the UE directly transmits a random access preamble and identity information to the access network device, and the access network device transmits an approach for resolving a conflict on the RACH along with a Physical Downlink Control Channel (PDCCH) scrambled by a Random Access-Radio Network Temporary Identifier (RA-RNTI) to the UE, so as to resolve the conflict on the RACH.

However, there are a number of trigger events for a conflict resolution approach for a contention-based 2-step random access. Scenarios corresponding to different trigger events have different requirements. There is no reasonable conflict resolution solution for these requirements yet.

SUMMARY

Embodiments of the present disclosure provide a power control method and apparatus for direct communications, a terminal, and a storage medium, capable of determining whether a conflict on a 2-step RACH is resolved based on whether a message B meets a condition corresponding to a trigger event. Technical solutions are provided as follows.

According to an aspect of the present disclosure, a 2-step random access method is provided. The method includes: transmitting, by a UE, a message A, when a 2-step random access is triggered based on a trigger event. The message A carries a Cell-Radio Network Temporary Identifier (C-RNTI) of the UE. The method further includes: receiving, by the UE, a message B; and determining, by the UE, that a conflict of the 2-step random access is resolved, when the message B satisfies a condition corresponding to the trigger event.

According to an aspect of the present disclosure, a 2-step random access method is provided. The method includes: receiving, by an access network device, a message A, which is transmitted by a UE based on a trigger event; and generating, by the access network device, a message B based on the trigger event of the message A. The message B satisfies a conflict resolution condition corresponding to the trigger event. The method further includes transmitting, by the access network device, the message B.

In at least one embodiment, the trigger event includes an uplink data arrival and the UE being in an uplink out-of-synchronization state, or a cell handover. Said transmitting, by the access network device, the message B includes: transmitting, by the access network device, a PDCCH scrambled by a C-RNTI, the PDCCH being used for scheduling downlink transmission; and transmitting, by the access network device, a Time Alignment Command (TAC) and an uplink scheduling grant based on the PDCCH.

According to an aspect of the present disclosure, a 2-step random access apparatus is provided. The apparatus includes a transmitting module, a receiving module and a processing module. The transmitting module is configured to transmit a message a based on a trigger cause. The message A carries a C-RNTI of a UE. The receiving module is configured to receive a message B. The processing module is configured to determine that a conflict of a 2-step random access is resolved, when the message B satisfies a condition corresponding to the trigger event.

According to an aspect of the present disclosure, a 2-step random access apparatus is provided. The apparatus includes a receiving module, a processing module and a transmitting module. The receiving module is configured to receive a message A. The message A is transmitted by a UE based on a trigger event, and carries a C-RNTI of the UE. The processing module is configured to generate a message B based on the trigger event of the message A. The message B satisfies a conflict resolution condition corresponding to the trigger event. The transmitting module is configured to transmit the message B. The message B indicates that a conflict of a 2-step random access is resolved, when a condition corresponding to the trigger event is satisfied.

According to an aspect of the present disclosure, a communication terminal is provided. The communication terminal includes a processor, and a transceiver connected to the processor. The processor is configured to load and execute executable instructions to implement the 2-step random access method as described in any of the above aspects.

According to an aspect of the present disclosure, a communication device is provided. The communication device includes a processor, and a transceiver connected to the processor. The processor is configured to load and execute executable instructions to implement the 2-step random access method as described in any of the above aspects.

According to an aspect of the present disclosure, a computer-readable storage medium is provided. The computer-readable storage medium stores at least one instruction, at least one segment of a program, a set of codes, or a set of instructions. The at least one instruction, the at least one segment of the program, the set of codes, or the set of instructions is loaded and executed by a processor to implement the 2-step random access method as described in any of the above aspects.

According to an aspect of the present disclosure, a chip is provided. The chip includes a programmable logic circuit and/or program instructions. When running, the chip is configured to implement the 2-step random access method as described in any of the above aspects.

According to an aspect of the present disclosure, a computer program product is provided. The computer program product includes one or more computer programs. The one or more computer programs, when executed by a processor, implement the 2-step random access method as described in any of the above aspects.

The technical solutions provided by the present disclosure can at least provide the following technical effects:

Based on whether the message B satisfies the condition corresponding to a trigger event, it can be determined whether a conflict on a 2-step random access channel is resolved. In this way, for different trigger events, the UE can determine, based on different conflict resolution conditions, whether a conflict is resolved, thereby improving an access success rate of a 2-step random access process. A problem that the UE has different requirements in scenarios corresponding to various trigger events is solved.

BRIEF DESCRIPTION OF DRAWINGS

In order to clearly explain technical solutions in embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

DESCRIPTION OF EMBODIMENTS

Exemplary embodiments will be described in detail here, and examples thereof are shown in the accompanying drawings. The same numbers in different drawings as described below indicate the same or similar elements, unless otherwise specified. Implementations described in the following exemplary embodiments, instead of representing all implementations consistent with the present disclosure, are merely examples of apparatuses and methods consistent with some aspects of the present disclosure as detailed in claims as attached.

An RACH is an important channel in an initial access process between an access network device and a UE. LTE adopts a contention-based 4-step random access mechanism, which will be simplified to a contention-based 2-step random access mechanism in some usage scenarios of an NR system.

Regarding the contention-based 2-step random access mechanism, the UE directly transmits a random access preamble and identity information to the access network device, and the access network device transmits an approach for resolving a conflict on the RACH along with a PDCCH scrambled by an RA-RNTI to the UE, so as to resolve the conflict on the RACH.

In the 2-step random access mechanism, however, different trigger events have different requirements for conflict resolution. Regarding how to determine that a conflict in a 2-step random access is resolved under different trigger events, the present disclosure provides the following embodiments.

Figure 1:
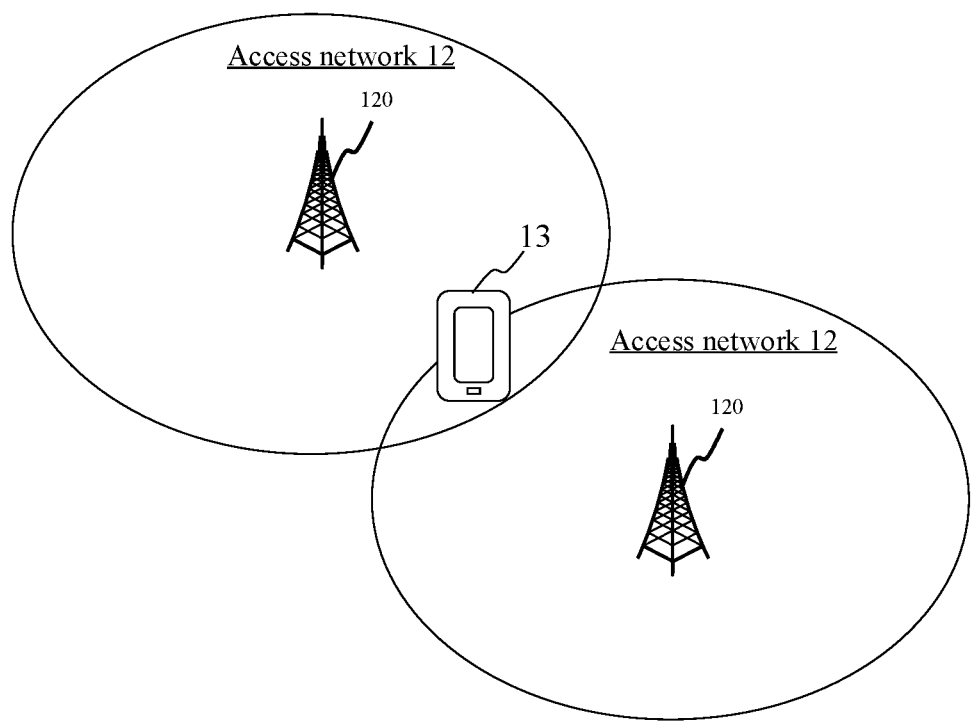
FIG. 1 is a schematic diagram showing a communication system according to an exemplary embodiment of the present disclosure.

FIG. 1 is a schematic diagram showing a communication system according to an exemplary embodiment of the present disclosure. An access network 12 includes a number of access network devices 120. The access network device 120 may be a base station. The base station is a device deployed in the access network to provide wireless communication functions for terminals. The base station includes any form of a macro base station, a micro base station, a relay station, an access point, etc. In systems using different wireless access technologies, names of devices functioning as base stations may be different. For example, in an LTE system, a device functioning as a base station can be referred to as generation NodeB (gNB) or evolved NB (eNB); and in a 5th-Generation (5G) NR-Unlicensed (NR-U) system, the device functioning as a base station can be referred to as gNodeB or gNB. As communication technology develops, the phrase "base station" may change. For convenience, in the embodiments of the present disclosure, the devices described above that provide wireless communication functions for a terminal 13 are collectively referred to as the access network device.

The terminal 13 may include various handheld devices, vehicle-mounted devices, wearable devices, computing devices with wireless communication functions or other processing devices connected to a wireless modem, and various forms of UE, Mobile Station (MS), terminal device, and the like. For the convenience of description, the devices mentioned above are collectively referred to as the terminal.

In a communication process between the terminal and the access network device, once the terminal finds a cell, the terminal may access the cell by connecting to the access network device of the cell. A process for the terminal to connect to the access network device is referred to as a random access process. In the random access process, the access network device needs to assign to the terminal a unique identifier in the cell. In an actual scenario, a number of terminals may respond to the response message, and thus a conflict occurs. To resolve such a conflict, the access network device needs to assign a unique C-RNTI to the terminal.

Figure 2:
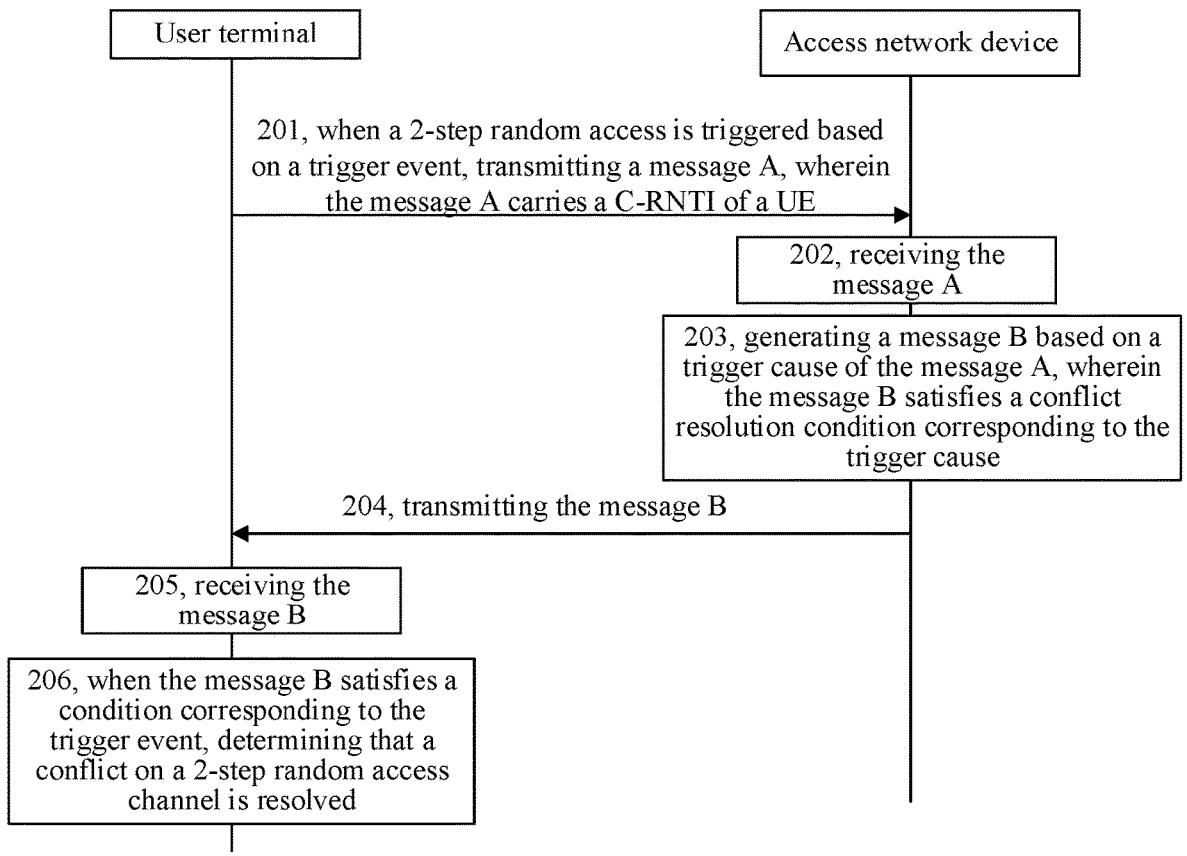
FIG. 2 is a flowchart illustrating a 2-step random access method according to an exemplary embodiment of the present disclosure.

FIG. 2 is a flowchart illustrating a 2-step random access method according to an exemplary embodiment of the present disclosure. The method may be executed by a UE and an access network device. The method includes the following operations.

At block 201, when a 2-step random access is triggered based on a trigger event, the UE transmits a message A. The message A carries a C-RNTI of the UE.

A 2-step random access mechanism is an evolution of a 4-step random access mechanism. In a process of the 2-step random access mechanism, the UE can directly transmit a random access preamble and identity information (such as the C-RNTI) to the access network device.

The message A includes the random access preamble and the identity information. That is, the message A includes contents of a message 1 and a message 3 in the 4-step random access.

At block 202, the access network device receives the message A.

After the UE transmits the random access preamble and the identity information to the access network device, the access network device can receive the message A from the UE.

At block 203, the access network device generates a message B based on the trigger event of the message A. The message B satisfies a conflict resolution condition corresponding to the trigger event.

The message B carries a random access response and a message for conflict resolution, e.g., PDCCH information scrambled by the C-RNTI.

At block 204, the access network device transmits the message B.

At block 205, the UE receives the message B.

After the UE transmits the message A, a detection window for the message B is opened.

In at least embodiment, when it receives the message B, the UE may receive other information based on an instruction from the message B.

In at least embodiment, when the UE receives the message B, the UE can determine whether the conflict is resolved.

access process. A problem that the UE has different requirements in scenarios corresponding to various trigger events is solved.

In a case that the message A includes a C-RNTI MAC CE, trigger events that trigger the UE to initiate the 2-step random access include at least the following seven types of trigger events.

Trigger event 1 (abbreviated as E1)—an uplink data arrival and the UE being in an out-of-synchronization state.

Trigger event 2 (abbreviated as E2)—an uplink data arrival but no Physical Uplink Control Channel (PUCCH) resource corresponding to a triggered Scheduling Request (SR).

Trigger event 3 (abbreviated as E3)—SR transmission reaching a failure threshold.

Trigger event 4 (abbreviated as E4)—a cell handover.

Trigger event 5 (abbreviated as E5)—an addition of time synchronization for a secondary cell.

Trigger event 6 (abbreviated as E6)—a beam failure recovery.

Trigger event 7 (abbreviated as E7)—a downlink data arrival and the UE being in an uplink out-of-synchronization state.

Among these trigger events, both the trigger event 1 and the trigger event 4 require the UE to obtain uplink TA on the one hand and an uplink scheduling grant on the other hand; in the trigger event 2 and the trigger event 3, since the UE is already in uplink synchronization, the uplink TA is unnecessary, but the uplink scheduling grant is still needed to transmit uplink data; in the trigger event 5 and the trigger event 7, the UE does not have uplink transmission to be scheduled, and only needs to obtain the uplink TA; and in the trigger event 6, the UE needs neither the uplink TA nor the uplink scheduling grant. In summary, the above seven trigger events can be summarized in the following table.

TABLE 1

| Trigger events that only need to obtain the uplink scheduling grant | Trigger events that only need to obtain the uplink TA | Trigger events that need to obtain both the uplink TA and the uplink scheduling grant | Trigger events that need neither the uplink TA nor the uplink scheduling grant |
| --- | --- | --- | --- |
| Uplink data arrival but no PUCCH resource corresponding to the triggered SR | Addition of the time synchronization for the secondary cell | Uplink data arrival and the UE being in an out-of-synchronization state | Beam failure recovery |
| SR transmission reaching the failure threshold | Downlink data arrival and the UE being in an uplink out-of-synchronization state | Cell handover | |

At block 206, when the message B satisfies a condition corresponding to the trigger event, it is determined that a conflict of the 2-step random access is resolved.

The condition corresponding to the trigger event is a conflict resolution condition corresponding to the trigger event. There are at least two trigger events that correspond to different conflict resolution conditions.

In summary, with the 2-step random access method according to the embodiment, it can be determined whether the conflict on the 2-step random access channel is resolved based on whether the message B satisfies the condition corresponding to a trigger event. In this way, for different trigger events, the UE can determine, based on different conflict resolution conditions, whether a conflict is resolved, thereby improving an access success rate of a 2-step random The following embodiments describe the above four cases.

Case 1

Figure 3:
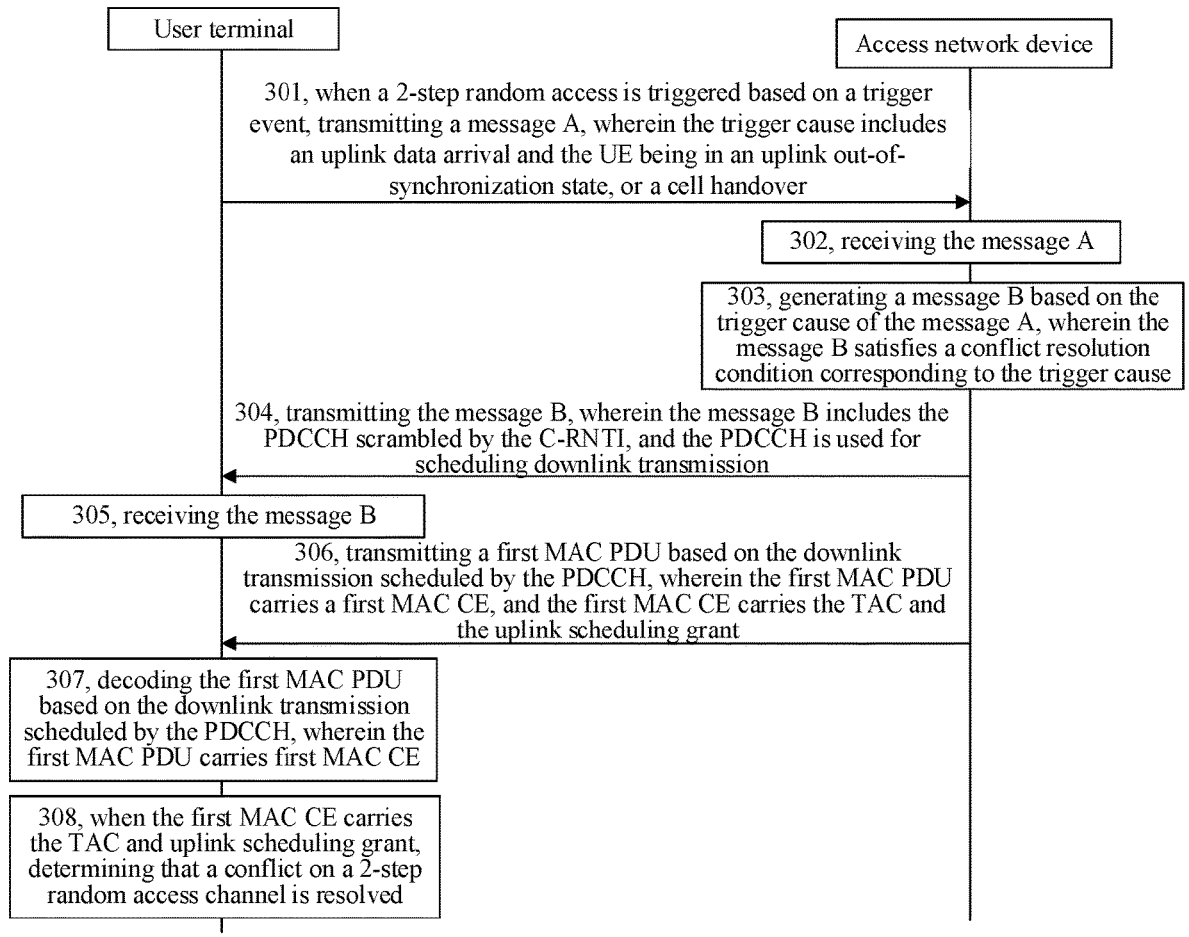
FIG. 3 is a flowchart illustrating a 2-step random access method according to an exemplary embodiment of the present disclosure.

FIG. 3 is a flowchart illustrating a 2-step random access method according to an exemplary embodiment of the present disclosure. The method may be executed by a UE and an access network device. The method includes the following operations.

At block 301, when a 2-step random access is triggered based on a trigger event, the UE transmits a message A. The trigger event includes an uplink data arrival and the UE being in an uplink out-of-synchronization state, or a cell handover.

The message A includes a random access preamble and a payload. The random access preamble is transmitted on a Physical Random Access Channel (PRACH) resource. The payload carries the content of the message 3 for the 4-step random access. For example, the payload carries a MAC CE, and the MAC CE carries the C-RNTI of the UE. The payload is carried on a Physical Uplink Shared Channel (PUSCH) for transmission.

The 2-step random access is triggered by the E1 or the E4. That is, the 2-step random access is triggered by a MAC sublayer or a Radio Resource Control (RRC) sublayer. In at least embodiment, the trigger cause is the UE being in the uplink out-of-synchronization state or the cell handover.

At block 302, the access network device receives the message A.

The access network device receives the random access preamble on the PRACH and receives the payload on the PUSCH.

At block 303, the access network device generates a message B based on the trigger event of the message A. The message B satisfies a conflict resolution condition corresponding to the trigger event.

When receiving the message A, the access network device learns other information (such as context information, state information of a synchronization timer, etc.) of the UE based on the C-RNTI in the message A, and learns the trigger event of the message A based on the other information and the state of the UE.

In this embodiment, since the trigger event of the message A is the UE being in the uplink out-of-synchronization state or the cell handover, the message B needs to meet a conflict resolution condition corresponding to the trigger event of the message A that can resolve the conflict.

In at least embodiment, the message B may directly include conflict resolution information corresponding to the trigger event of the message A that can resolve the conflict, or downlink transmission (or uplink transmission) scheduled by information in the message B may include the conflict resolution information corresponding to the trigger event of the message A that can resolve the conflict.

At block 304, the access network device transmits the message B. The message B includes the PDCCH scrambled by the C-RNTI, and the PDCCH is used for scheduling downlink transmission.

In at least embodiment, the PDCCH carries Downlink Control Information (DCI). The DCI is used for scheduling the downlink transmission.

At block 305, the UE receives the message B.

After the UE transmits the message A, the detection window for the message B is opened. The UE uses its own C-RNTI to descramble the PDCCH.

After receiving the message B in the detection window, the UE obtains the DCI in the PDCCH.

At block 306, the access network device transmits a first MAC Protocol Data Unit (PDU) based on the downlink transmission scheduled by the PDCCH. The first MAC PDU carries a first MAC CE, and the first MAC CE carries a Time Alignment Command (TAC) and an uplink scheduling grant (UL grant for short).

Figure 4:
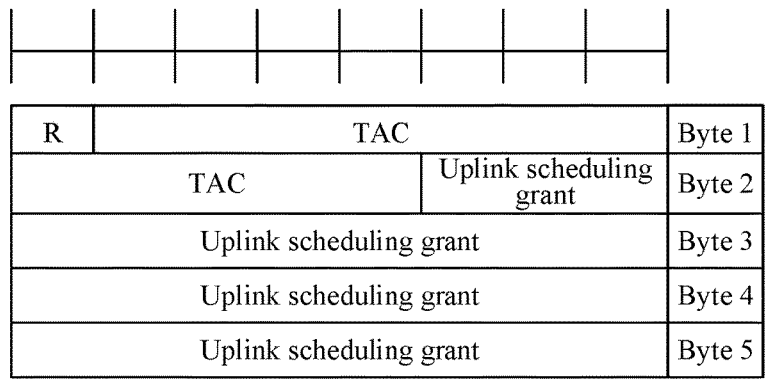
FIG. 4 is a format diagram of a Media Access Control Control Element (MAC CE) according to an exemplary embodiment of the present disclosure.

FIG. 4 is a format diagram of a first MAC CE according to an exemplary embodiment of the present disclosure. Referring to FIG. 4, in a message format of the first MAC CE, the first MAC CE occupies 5 bytes, and each byte has 8 bits. The TAC occupies 12 bits in byte 1 and byte 2, and the uplink scheduling grant occupies 27 bits in byte 2 to byte 5. Here, R is a reserved bit.

In at least embodiment, numbers of bits occupied by the TAC and the uplink scheduling grant may be different from those in FIG. 4, which are not limited in this embodiment.

The TAC is used to enable the UE to regain uplink synchronization with the access network device. The uplink scheduling grant is used for scheduling resources for the UE to perform uplink transmission.

In this embodiment, the TAC and the uplink scheduling grant are packaged in a same MAC CE for transmission. The TAC and the uplink scheduling grant correspond to a same MAC subheader, and only need one Logical Channel Identifier (LCID) indication.

At block 307, the UE decodes the first MAC PDU based on the downlink transmission scheduled by the PDCCH. The first MAC PDU carries the first MAC CE.

The UE receives and decodes the first MAC PDU based on scheduling of the DCI in the PDCCH, and the first MAC PDU carries the first MAC CE.

At block 308, when the first MAC CE carries the TAC and the uplink scheduling grant, it is determined that the conflict of the 2-step random access is resolved.

In summary, with the 2-step random access method according to this embodiment, when the UE needs to obtain both the uplink TA and the uplink scheduling grant, the method of using the PDCCH to schedule a single MAC CE that includes both the TAC and the uplink scheduling grant enables transmission of conflict resolution to be completed with only one MAC CE, which simplifies and reduces interaction procedures between the UE and the access network device.

Figure 5:
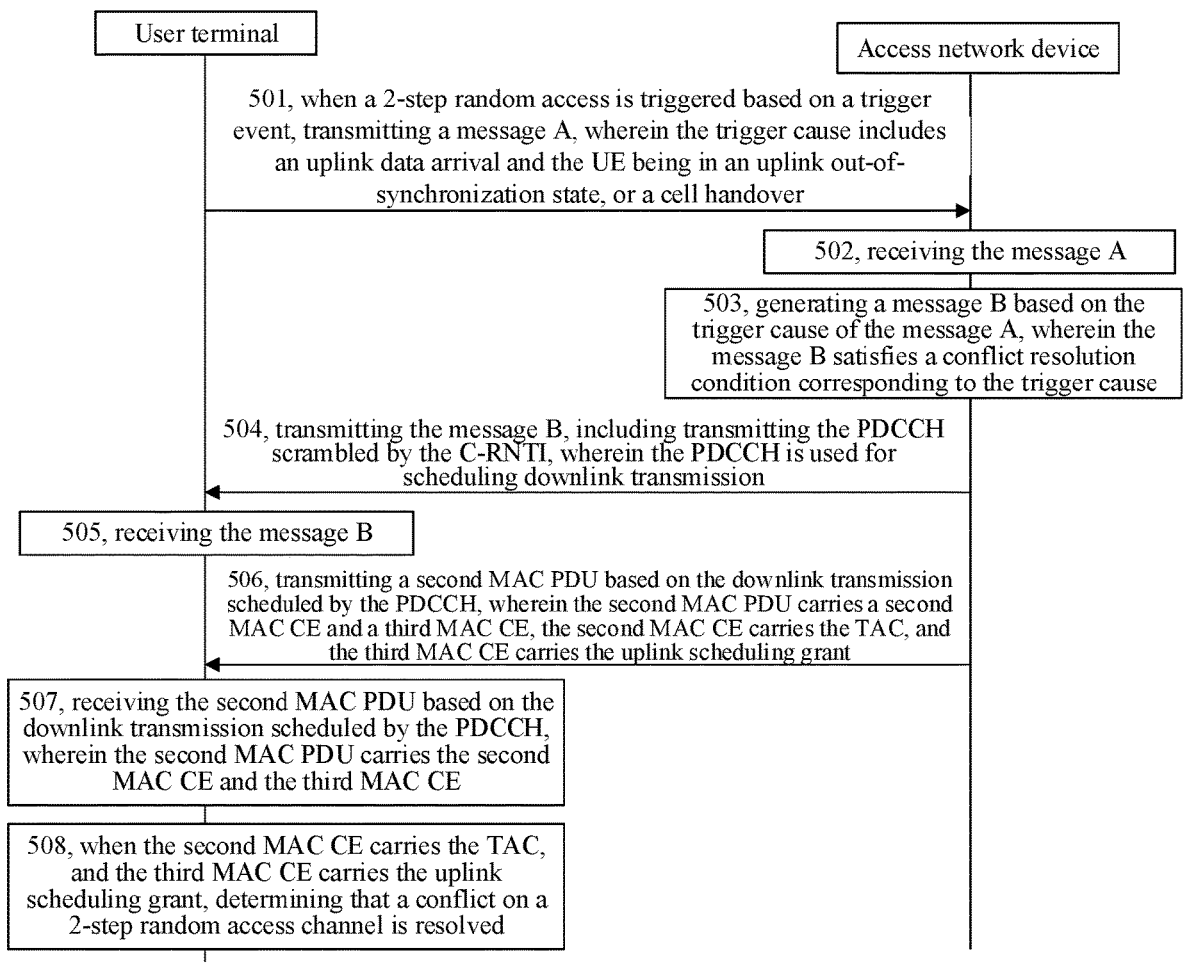
FIG. 5 is a flowchart illustrating a 2-step random access method according to an exemplary embodiment of the present disclosure.

FIG. 5 is a flowchart illustrating a 2-step random access method according to an exemplary embodiment of the present disclosure. The method may be executed by a UE and an access network device. The method includes the following operations.

At block 501, when a 2-step random access is triggered based on a trigger event, the UE transmits a message A. The trigger event includes an uplink data arrival and the UE being in an uplink out-of-synchronization state, or a cell handover.

The message A includes a random access preamble and a payload. The random access preamble is transmitted on a PRACH resource. The payload carries the content of the message 3 for the 4-step random access. For example, the payload carries a MAC CE, and the MAC CE carries the C-RNTI of the UE. The payload is carried on the PUSCH for transmission.

The 2-step random access is triggered by the E1 or the E4. That is, the 2-step random access is triggered by the MAC sublayer or the RRC sublayer. In at least embodiment, the message A also carries the trigger cause, i.e., the UE being in the uplink out-of-synchronization state, or the cell handover.

At block 502, the access network device receives the message A.

The access network device receives the random access preamble on the PRACH and receives the payload on the PUSCH.

At block 503, the access network device generates a message B based on the trigger event of the message A. The message B satisfies a conflict resolution condition corresponding to the trigger event.

When receiving the message A, the access network device learns other information (such as context information, state information of a synchronization timer, etc.) of the UE based on the C-RNTI in the message A, and learns the trigger event of the message A based on the other information and the state of the UE.

In this embodiment, since the trigger event of the message A is the UE being in the uplink out-of-synchronization state or the cell handover, the message B needs to meet a conflict resolution condition corresponding to the trigger event of the message A that can resolve the conflict.

In at least embodiment, the message B may directly include conflict resolution information corresponding to the trigger event of the message A that can resolve the conflict, or downlink transmission (or uplink transmission) scheduled by information in the message B may include the conflict resolution information corresponding to the trigger event of the message A that can resolve the conflict.

At block 504, the access network device transmits the message B. The message B includes the PDCCH scrambled by the C-RNTI, and the PDCCH is used for scheduling downlink transmission.

In at least embodiment, the PDCCH carries the DCI. The DCI is used for scheduling the downlink transmission.

At block 505, the UE receives the message B.

After the UE transmits the message A, the detection window for the message B is opened. The UE uses its own C-RNTI to descramble the PDCCH.

After receiving the message B in the detection window, the UE obtains the DCI in the PDCCH.

At block 506, the access network device transmits a second MAC PDU based on the downlink transmission scheduled by the PDCCH. The second MAC PDU carries a second MAC CE and a third MAC CE, the second MAC CE carries the TAC, and the third MAC CE carries the uplink scheduling grant.

Figure 6:
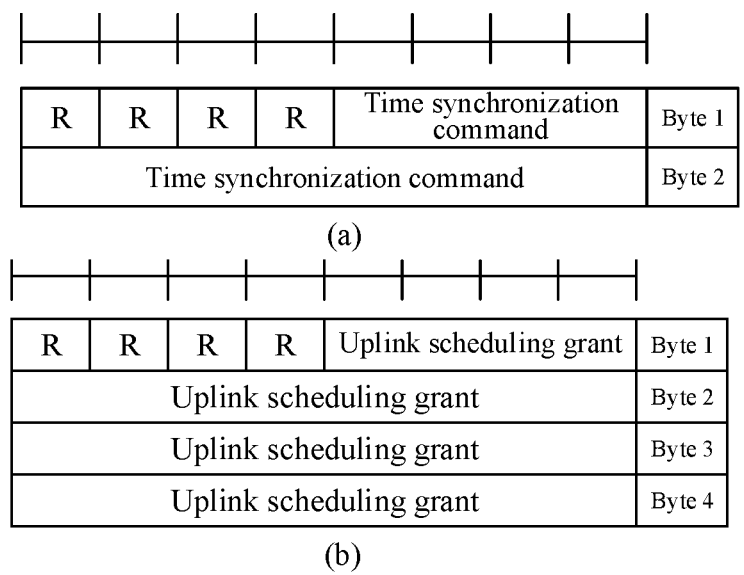
FIG. 6 is a format diagram of an MAC CE according to an exemplary embodiment of the present disclosure.

FIG. 6 is a format diagram of a second MAC CE and a third MAC CE according to an exemplary embodiment of the present disclosure. Referring to (a) in FIG. 6, in a format of the second MAC CE, the second MAC CE occupies 16 bits in byte 1 and byte 2. Referring to (b) in FIG. 6, in a format of the third MAC CE, the third MAC CE occupies 32 bits in byte 1 to byte 4. Here, R is a reserved bit.

In at least embodiment, numbers of bits occupied by the TAC and the uplink scheduling grant may be different from those in FIG. 4, which are not limited in this embodiment.

The TAC is used to enable the UE to regain uplink synchronization with the access network device. The uplink scheduling grant is used for scheduling resources for the UE to perform uplink transmission.

In this embodiment, the TAC and the uplink scheduling grant are packaged in different MAC CEs for transmission. The TAC and the uplink scheduling grant correspond to different MAC subheaders, and the TAC and the uplink scheduling grant each require an LCID indication. That is, the TAC and the uplink scheduling grant have different LCID indications.

At block 507, the UE decodes a second MAC PDU based on the downlink transmission scheduled by the PDCCH. The second MAC PDU carries a second MAC CE and a third MAC CE.

The UE decodes the second MAC CE including the TAC and the third MAC CE including the uplink scheduling grant from the second MAC PDU based on the downlink transmission scheduled by the PDCCH.

At block 508, when the second MAC CE carries the TAC, and the third MAC CE carries the uplink scheduling grant, it is determined that the conflict of the 2-step random access is resolved.

After obtaining the TAC and the uplink scheduling grant by decoding the two MAC CEs separately, the UE can determine that the conflict of the 2-step random access is resolved.

In summary, with the 2-step random access method according to this embodiment, when the UE needs to obtain both the uplink TA and the uplink scheduling grant, the method of using the PDCCH to schedule two MAC CEs that include both the TAC and the uplink scheduling grant enables the TAC and the uplink scheduling grant to be transmitted separately, which increases flexibility of interaction between the UE and the access network device.

Figure 7:
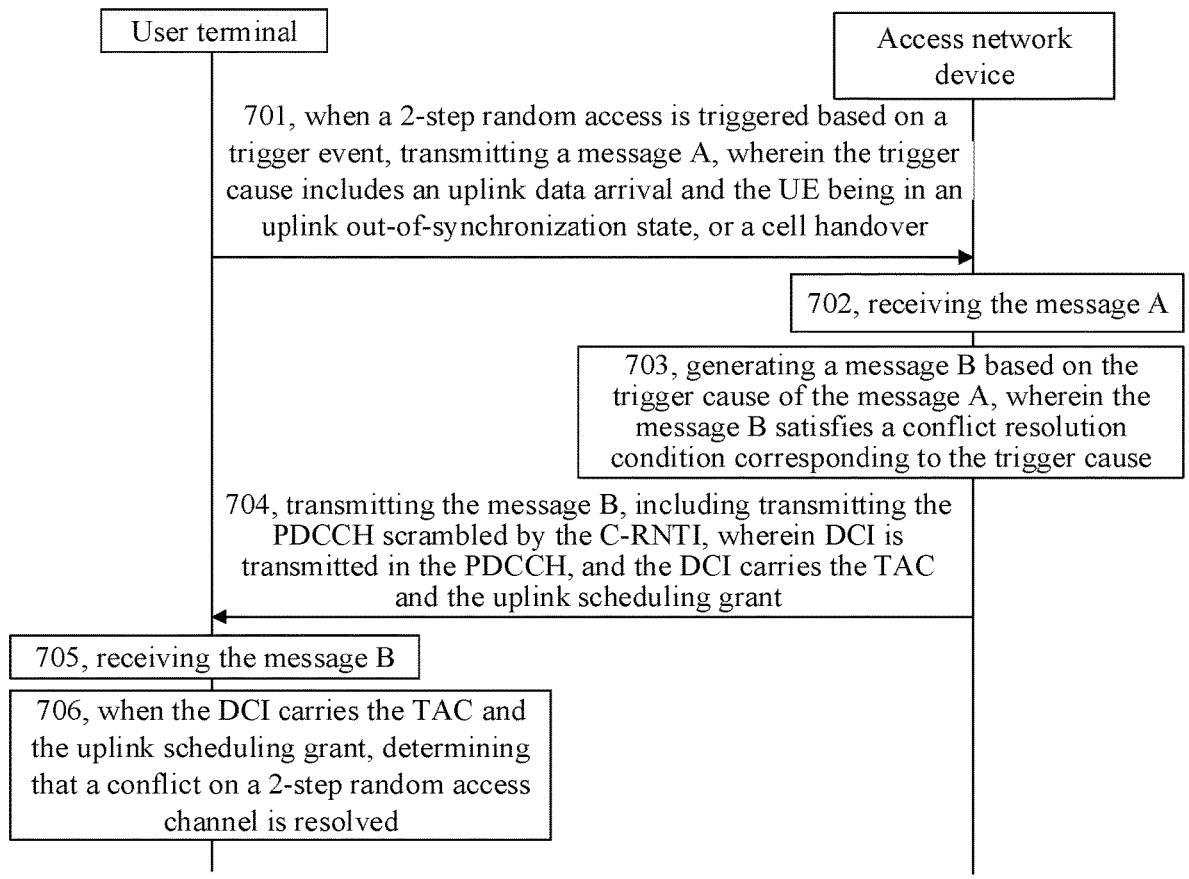
FIG. 7 is a flowchart illustrating a 2-step random access method according to an exemplary embodiment of the present disclosure.

FIG. 7 is a flowchart illustrating a 2-step random access method according to an exemplary embodiment of the present disclosure. The method may be executed by a UE and an access network device. The method includes the following operations.

At block 701, when a 2-step random access is triggered based on a trigger event, the UE transmits a message A. The trigger event includes an uplink data arrival and the UE being in an uplink out-of-synchronization state, or a cell handover.

The message A includes a random access preamble and a payload. The random access preamble is transmitted on a PRACH resource. The payload carries the content of the message 3 for the 4-step random access. For example, the payload carries a MAC CE, and the MAC CE carries the C-RNTI of the UE. The payload is carried on the PUSCH for transmission.

The 2-step random access is triggered by the E1 or the E4. That is, the 2-step random access is triggered by the MAC sublayer or the RRC sublayer. In at least embodiment, the message A also carries the trigger cause, i.e., the UE being in the uplink out-of-synchronization state, or the cell handover.

At block 702, the access network device receives the message A.

The access network device receives the random access preamble on the PRACH and receives the payload on the PUSCH.

At block 703, the access network device generates a message B based on the trigger event of the message A. The message B satisfies a conflict resolution condition corresponding to the trigger event.

When receiving the message A, the access network device learns other information (such as context information, state information of a synchronization timer, etc.) of the UE based on the C-RNTI in the message A, and learns the trigger event of the message A based on the other information and the state of the UE.

In this embodiment, since the trigger event of the message A is the UE being in the uplink out-of-synchronization state or the cell handover, the message B needs to meet a conflict resolution condition corresponding to the trigger event of the message A that can resolve the conflict.

In at least embodiment, the message B may directly include conflict resolution information corresponding to the trigger event of the message A that can resolve the conflict, or downlink transmission (or uplink transmission) scheduled by information in the message B may include the conflict resolution information corresponding to the trigger event of the message A that can resolve the conflict.

At block 704, the access network device transmits the message B. The message B includes the PDCCH scrambled by the C-RNTI. DCI is transmitted in the PDCCH. The DCI carries the TAC and the uplink scheduling grant.

In at least embodiment, the PDCCH carries the DCI, and the DCI carries the TAC and the uplink scheduling grant.

The DCI is used for scheduling the uplink transmission. The uplink scheduling grant is used for new data transmission.

At block 705, the UE receives the message B.

After the UE transmits the message A, the detection window for the message B is opened. The UE uses its own C-RNTI to descramble the PDCCH.

At block 706, when the DCI carries the TAC and the uplink scheduling grant, it is determined that a conflict of a 2-step random access is resolved.

When the DCI carries the TAC and the uplink scheduling grant, it is determined that the conflict of the 2-step random access is resolved.

In summary, with the 2-step random access method according to this embodiment, the TAC and the uplink scheduling grant can be obtained after the UE receives the PDCCH of the message B, such that the UE can learn that the conflict is resolved as quickly as possible, thereby shortening time consumed by the 2-step random access.

Figure 8:
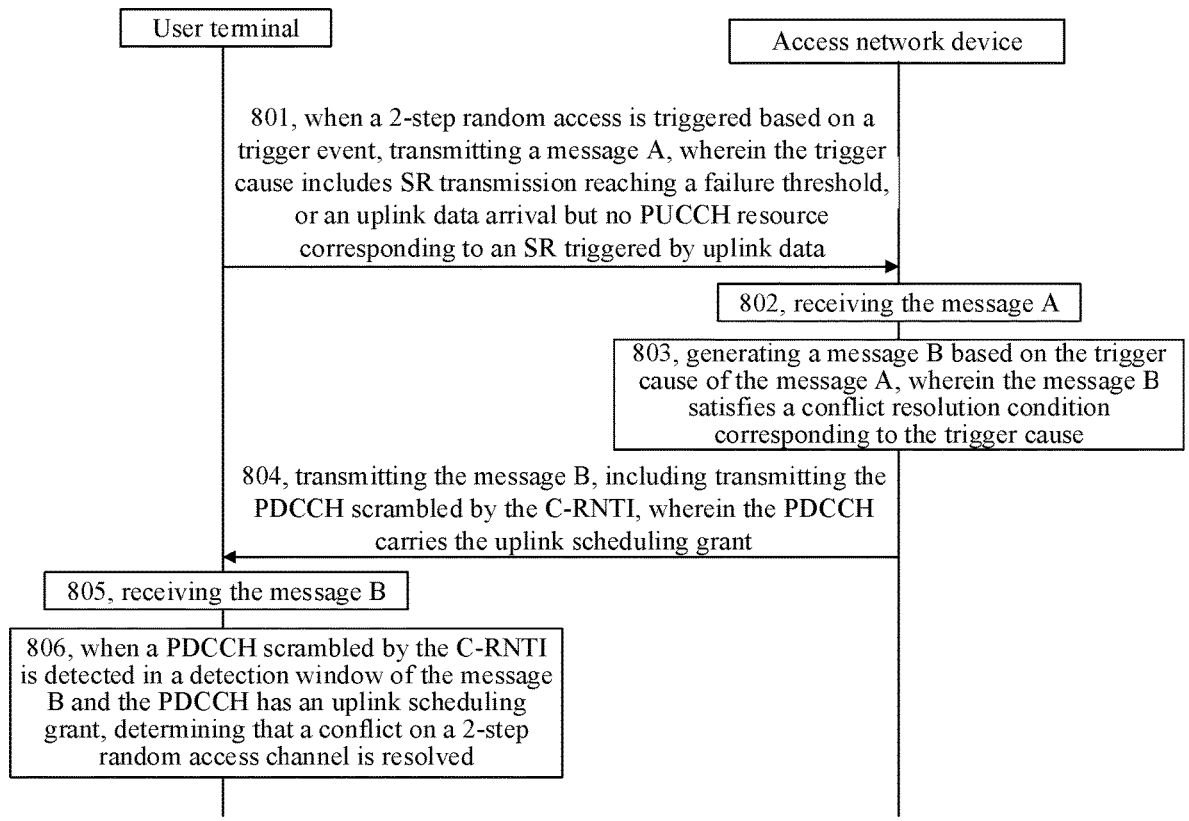
FIG. 8 is a flowchart illustrating a 2-step random access method according to an exemplary embodiment of the present disclosure.

FIG. 8 is a flowchart illustrating a 2-step random access method according to an exemplary embodiment of the present disclosure. The method may be executed by a UE and an access network device. The method includes the following operations.

At block 801, when a 2-step random access is triggered based on a trigger event, the UE transmits a message A. The trigger event includes SR transmission reaching a failure threshold, or an uplink data arrival but no PUCCH resource corresponding to an SR triggered by uplink data.

The SR refers to an uplink scheduling request of the UE. When uplink data needs to be transmitted, the UE needs to transmit an SR to the access network device.

The message A includes a random access preamble and a payload. The random access preamble is transmitted on a PRACH resource. The payload carries the content of the message 3 for the 4-step random access. For example, the payload carries a MAC CE, and the MAC CE carries the C-RNTI of the UE. The payload is carried on the PUSCH for transmission.

The 2-step random access is triggered by the E2 or the E3. In at least embodiment, the trigger cause is also carried in the message A.

At block 802, the access network device receives the message A.

The access network device receives the random access preamble on the PRACH and receives the payload on the PUSCH.

At block 803, the access network device generates a message B based on the trigger event of the message A. The message B satisfies a conflict resolution condition corresponding to the trigger event.

When receiving the message A, the access network device learns other information (such as context information, state information of a synchronization timer, etc.) of the UE based on the C-RNTI in the message A, and learns the trigger event of the message A based on the other information and the state of the UE.

In this embodiment, since the trigger event of the message A is the SR transmission reaching the failure threshold, or the uplink data arrival but no PUCCH resource corresponding to the triggered SR, the message B needs to satisfy the conflict resolution condition corresponding to the trigger event of the message A that can resolve the conflict.

At block 804, the access network device transmits the message B to the UE. The message B includes the PDCCH scrambled by the C-RNTI, and the PDCCH carries the uplink scheduling grant.

In at least embodiment, the PDCCH carries the DCI, and the DCI is used for scheduling the uplink transmission. The DCI carries the uplink scheduling grant.

At block 805, the UE receives the message B.

After the UE transmits the message A, the detection window for the message B is opened. The UE uses its own C-RNTI to descramble the PDCCH.

After the UE receives the message B in the detection window, the UE obtains the DCI in the PDCCH.

At block 806, when a PDCCH scrambled by the C-RNTI is detected in the detection window of the message B and the PDCCH has an uplink scheduling grant, it is determined that the conflict of the 2-step random access is resolved.

It is determined that the conflict of the 2-step random access is resolved, when the PDCCH scrambled by the C-RNTI is detected in the detection window of the message B, and the DCI that carries the uplink scheduling grant is decoded from the PDCCH.

In summary, with the 2-step random access method according to this embodiment, when the UE only needs to obtain the uplink scheduling grant, the uplink scheduling grant can be transmitted directly to the UE in the message B, which simplifies and reduces interaction processes between the UE and the access network device.

Figure 9:
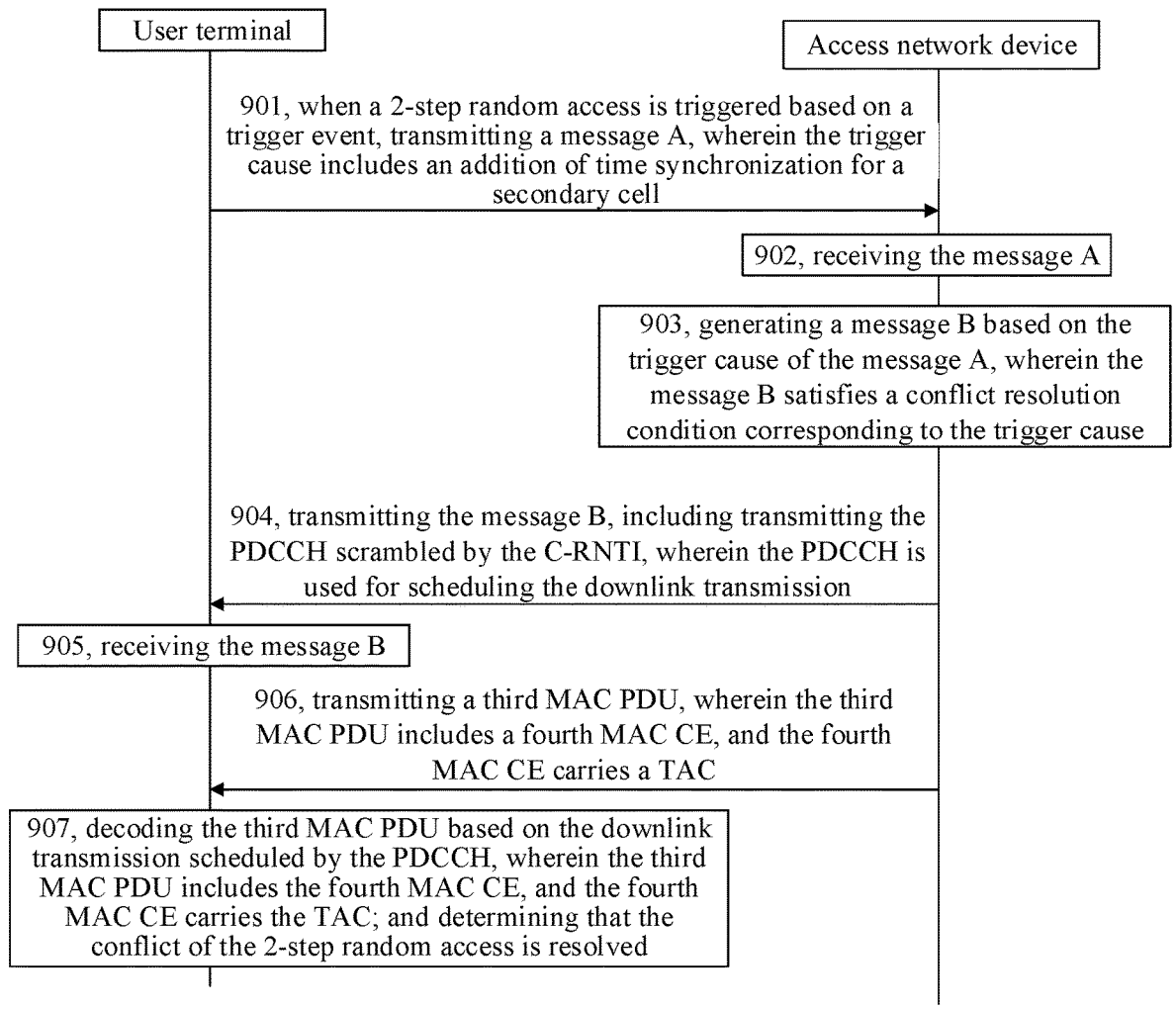
FIG. 9 is a flowchart illustrating a 2-step random access method according to an exemplary embodiment of the present disclosure.

FIG. 9 is a flowchart illustrating a 2-step random access method according to an exemplary embodiment of the present disclosure. The method may be executed by a UE and an access network device. The method includes the following operations.

At block 901, when a 2-step random access is triggered based on a trigger event, the UE transmits a message A. The trigger event includes an addition of time synchronization for a secondary cell, or a downlink data arrival and the UE being in an uplink out-of-synchronization state.

When the UE is in a primary cell and needs to perform information transmission with the access network device of the secondary cell, time synchronization with the secondary cell needs to be performed. In this case, the UE needs to obtain the uplink TA. Or, when a downlink data arrival occurs at the UE and the UE is in the uplink out-of-synchronization state, the UE also needs to obtain the uplink TA.

The message A includes a random access preamble and a payload. The random access preamble is transmitted on a PRACH resource. The payload carries the content of the message 3 for the 4-step random access. For example, the payload carries a MAC CE, and the MAC CE carries the C-RNTI of the UE. The payload is carried on the PUSCH for transmission.

The 2-step random access is triggered by the E5 or the E7. In at least embodiment, the trigger cause is also carried in the message A.

At block 902, the access network device receives the message A.

The access network device receives the random access preamble on the PRACH and receives the payload on the PUSCH.

At block 903, the access network device generates a message B based on the trigger event of the message A. The message B satisfies a conflict resolution condition corresponding to the trigger event.

When receiving the message A, the access network device learns the trigger event of the message A based on information in the message A and other information and states of the UE and the access network device.

In this embodiment, since the trigger event of the message A is the addition of the time synchronization for the secondary cell, or the downlink data arrival and the UE being in the uplink out-of-synchronization state, the message B needs to satisfy the conflict resolution condition corresponding to the trigger event of the message A that can resolve the conflict.

At block 904, the access network device transmits the message B to the UE. The message B includes the PDCCH scrambled by the C-RNTI, and the PDCCH is used for scheduling the downlink transmission.

In at least embodiment, the PDCCH carries the DCI, and the DCI is used for scheduling the downlink transmission.

At block 905, the UE receives the message B.

After the UE transmits the message A, the detection window for the message B is opened. The UE uses its own C-RNTI to descramble the PDCCH.

After the UE receives the message B in the detection window, the UE obtains the DCI in the PDCCH.

At block 906, the access network device transmits a third MAC PDU to the UE based on the downlink transmission scheduled by the PDCCH. The third MAC PDU includes a fourth MAC CE, and the fourth MAC CE carries a TAC.

Figure 10:
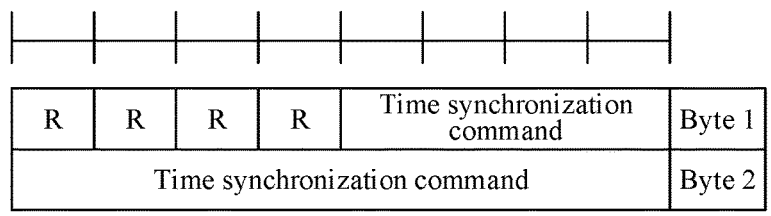
FIG. 10 is a format diagram of an MAC CE according to an exemplary embodiment of the present disclosure.

FIG. 10 is a format diagram of a fourth MAC CE according to an exemplary embodiment of the present disclosure. Referring to FIG. 10, in the format of the fourth MAC CE, the TAC occupies 12 bits of byte 1 and byte 2.

In at least embodiment, the number of bits occupied by the TAC may be different from that in FIG. 10, and this embodiment of the present disclosure is not limiting in this regard.

At block 907, the UE decodes the third MAC PDU based on the downlink transmission scheduled by the PDCCH, the third MAC PDU including the fourth MAC CE, the fourth MAC CE carrying the TAC; and the UE determines that the conflict of the 2-step random access is resolved.

In summary, with the 2-step random access method according to this embodiment, when the UE only needs to obtain the TAC, the TAC is transmitted to the UE via the downlink transmission scheduled by the PDCCH of the message B, which simplifies and reduces interaction processes between the UE and the access network device.

Figure 11:
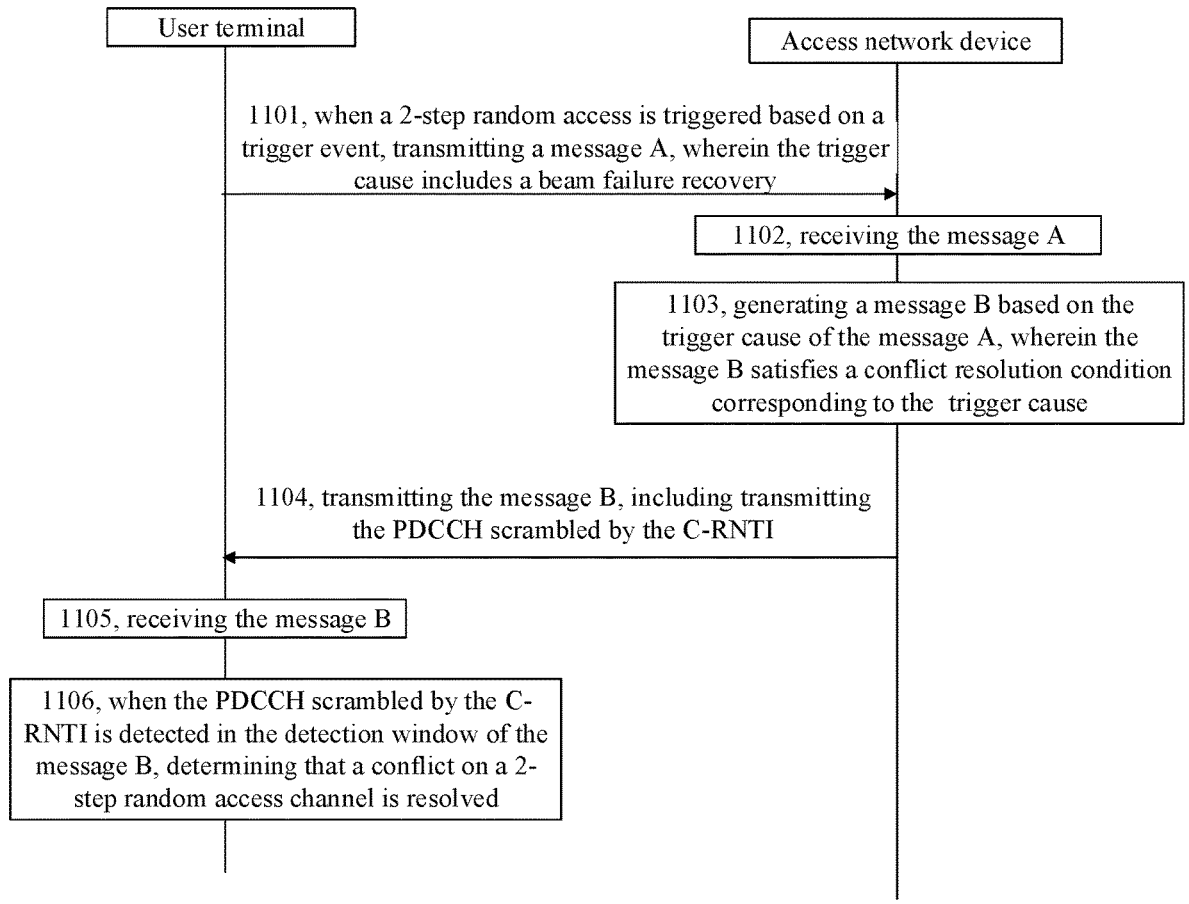
FIG. 11 is a flowchart illustrating a 2-step random access method according to an exemplary embodiment of the present disclosure.

FIG. 11 is a flowchart illustrating a 2-step random access method according to an exemplary embodiment of the present disclosure. The method may be executed by a UE and an access network device. The method includes the following operations.

At block 1101, when a 2-step random access is triggered based on a trigger event, the UE transmits a message A. The trigger event includes a beam failure recovery.

The beam failure recovery is a function of beam management. When a base station beam and a terminal beam that are originally aligned with each other are blocked by an obstacle (such as a person, a vehicle, etc.), it is necessary to find a new pair of beams that can be aligned with each other on a certain reflection path to ensure that communication can continue.

The message A includes a random access preamble and a payload. The random access preamble is transmitted on a PRACH resource. The payload carries the content of the message 3 for the 4-step random access. For example, the payload carries a MAC CE, and the MAC CE carries the C-RNTI of the UE. The payload is carried on the PUSCH for transmission.

The 2-step random access is triggered by the E6. In at least embodiment, the trigger cause is also carried in the message A.

At block 1102, the access network device receives the message A.

The access network device receives the random access preamble on the PRACH and receives the payload on the PUSCH.

At block 1103, the access network device generates a message B based on the trigger event of the message A. The message B satisfies a conflict resolution condition corresponding to the trigger event.

When receiving the message A, the access network device learns the trigger event of the message A based on the information in the message A and other information and states of the UE and the access network device.

In this embodiment, since the trigger event of the message A is the beam failure recovery, the message B needs to satisfy the conflict resolution condition corresponding to the trigger event of the message A that can resolve the conflict.

At block 1104, the access network device transmits the message B to the UE. The message B includes the PDCCH scrambled by the C-RNTI.

In this embodiment, since the trigger event of the message A is the UE being in the uplink out-of-synchronization state or the cell handover, the message B needs to satisfy the conflict resolution condition corresponding to the trigger event of the message A that can resolve the conflict.

In at least embodiment, the message B may directly include conflict resolution information corresponding to the trigger event of the message A that can resolve the conflict, or the downlink transmission (or the uplink transmission) scheduled by the information in the message B may include the conflict resolution information corresponding to the trigger event of the message A that can resolve the conflict.

At block 1105, the UE receives the message B.

After the UE transmits the message A, the detection window for the message B is opened. The UE uses its own C-RNTI to descramble the PDCCH.

At block 1106, when the PDCCH scrambled by the C-RNTI is received in the detection window of the message B, it is determined that the conflict of the 2-step random access is resolved.

In summary, with the 2-step random access method according to this embodiment, in a scenario of the beam failure recovery, the conflict can be considered to be successfully resolved when the access network device transmits the PDCCH scrambled by the C-RNTI to the UE, which simplifies and reduces interaction processes between the UE and the access network device.

Based on the description of the above embodiments, during transmission of the message A, an entity at a MAC layer performs the following procedures:

1> At the end of the transmission of the message A, the detection window for the message B is opened in a 1-st PDCCH.

1> During an operation of the detection window for the message B, the message B in the primary cell and the secondary cell in the PDCCH is monitored through the RA-RNTI and the C-RNTI.

1> If a reception notification in the PDCCH in the primary cell or the secondary cell is obtained from a lower layer, then:

2> if a C-RNTI MAC CE is included in the message A, then:

3> when a random access procedure starts from a beam failure process and an address of the PDCCH transmission is located by the C-RNTI, or 3> when the random access procedure starts with a PDCCH instruction, and the MAC PDU includes a MAC CE carrying a TAC, or 3> when the random access procedure starts from a MAC sublayer (for example, the uplink data arrival but no PUCCH resource corresponding to the triggered SR, or the SR transmission reaching the failure threshold), and a PDCCH whose transmission address is located to the C-RNTI includes an uplink scheduling grant corresponding to a new transmission, or 3> when the uplink data arrival occurs and the UE is in an out-of-synchronization state (for example, for scene switching) and the PDCCH is located to the C-RNTI, and the MAC PDU is successfully decoded and the MAC PDU includes a MAC CE of the TAC and the uplink scheduling grant, then:

4> it is determined that a correct solution is provided;

4> the operation of the detection window for the message B is stopped; and

4> it is determined that the random access process is successfully completed.

Figure 12:
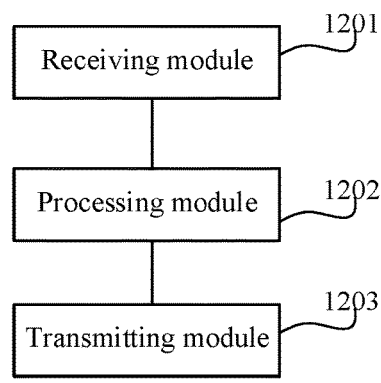
FIG. 12 is a block diagram showing a structure of a 2-step random access apparatus according to an exemplary embodiment of the present disclosure.

FIG. 12 is a block diagram showing a structure of a 2-step random access apparatus according to an exemplary embodiment of the present disclosure. The apparatus can be implemented as the UE or part of the UE via software, hardware or a combination thereof. The apparatus includes a receiving module 1201, a processing module 1202, and a transmitting module 1203.

The transmitting module 1203 is configured to transmit a message A when a 2-step random access is triggered based on a trigger event. The message A carries a C-RNTI of a UE.

The receiving module 1201 is configured to receive a message B.

The processing module 1202 is configured to determine that a conflict of the 2-step random access is resolved, when the message B satisfies a condition corresponding to the trigger event.

In an example, the trigger event includes an uplink data arrival and the UE being in an uplink out-of-synchronization state, or a cell handover.

The processing module 1202 being configured to determine that the conflict of the 2-step random access is resolved, when the message B satisfies the condition corresponding to the trigger event, includes: the processing module 1202 being configured to detect a PDCCH scrambled by the C-RNTI in a detection window of the message B; and the receiving module 1201 being configured to receive a TAC and an uplink scheduling grant based on the PDCCH, and to determine that the conflict of the 2-step random access is resolved.

In an example, the PDCCH is used for scheduling downlink transmission.

The receiving module 1201 being configured to receive the TAC and the uplink scheduling grant based on the PDCCH, and to determine that the conflict of the 2-step random access channel is resolved includes: decoding, by the UE, a MAC PDU based on the downlink transmission scheduled by the PDCCH, the MAC PDU including a first MAC CE, the first MAC CE carrying the TAC and the uplink scheduling grant; and determining that the conflict of the 2-step random access is resolved. Or it includes: decoding, by the UE, a MAC PDU based on the downlink transmission scheduled by the PDCCH, the MAC PDU including a second MAC CE and a third MAC CE, the second MAC CE carrying the TAC, the third MAC CE carrying the uplink scheduling grant; and determining that the conflict of the 2-step random access is resolved, the uplink scheduling grant being used for new data transmission.

In an example, the PDCCH is used for scheduling uplink transmission.

The processing module 1202 is configured to determine, when DCI decoded based on the PDCCH carries the TAC and the uplink scheduling grant, that the conflict on the random access channel is resolved. The uplink scheduling grant is used for new data transmission.

In an example, the trigger event includes SR transmission reaching a failure threshold, or an uplink data arrival but no PUCCH resource corresponding to an SR triggered by uplink data.

The processing module 1202 is configured to determine that the conflict of the 2-step random access is resolved, when a PDCCH scrambled by the C-RNTI is detected in a detection window of the message B and the PDCCH carries an uplink scheduling grant.

In an example, the trigger event includes an addition of time synchronization for a secondary cell, or a downlink data arrival and the UE being in an uplink out-of-synchronization state.

The processing module 1202 is configured to detect a PDCCH scrambled by the C-RNTI in a detection window of the message B.

The processing module 1202 is configured to decode a MAC PDU by the UE based on the downlink transmission scheduled by the PDCCH, the MAC PDU including a fourth MAC CE, the fourth MAC CE carrying a TAC; and to determine that the conflict of the 2-step random access is resolved.

In an example, the trigger event includes a beam failure recovery.

The processing module 1202 is configured to determine that the conflict on the 2-step random access is resolved, when a PDCCH scrambled by the C-RNTI is detected in a detection window of the message B.

Figure 13:
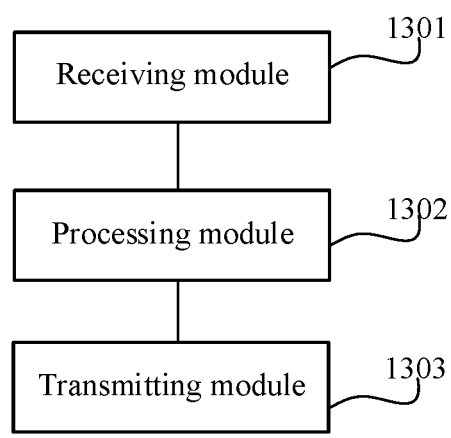
FIG. 13 is a block diagram showing a structure of a 2-step random access apparatus according to an exemplary embodiment of the present disclosure.

FIG. 13 is a block diagram showing a structure of a 2-step random access apparatus according to an exemplary embodiment of the present disclosure. The apparatus can be implemented as the access network device or part of the access network device via software, hardware or a combination thereof. The apparatus includes a receiving module 1301, a processing module 1302, and a transmitting module 1303.

The receiving module 1301 is configured to receive a message A. The message A is transmitted by a UE based on a trigger event.

The processing module 1302 is configured to generate a message B based on the trigger event of the message A. The message B satisfies a conflict resolution condition corresponding to the trigger event.

The transmitting module 1303 is configured to transmit the message B.

In an example, the trigger event includes an uplink data arrival and the UE being in an uplink out-of-synchronization state, or a cell handover.

The transmitting module 1303 is configured to transmit by the access network device a PDCCH scrambled by the C-RNTI. The PDCCH is used for scheduling downlink transmission.

The transmitting module is configured to transmit by the access network device a TAC and an uplink scheduling grant based on the PDCCH.

In an example, the transmitting module 1303 is configured to transmit a first MAC CE based on the downlink transmission scheduled by the PDCCH, the first MAC CE carrying the TAC and the uplink scheduling grant. Or the access network device is configured to transmit a second MAC CE and a third MAC CE based on the downlink transmission scheduled by the PDCCH, the second MAC CE carrying the TAC, the third MAC CE carrying the uplink scheduling grant.

In an example, the transmitting module 1303 is configured to transmit DCI in the PDCCH. The DCI carries the TAC and the uplink scheduling grant.

In an example, the trigger event includes SR transmission reaching a failure threshold, or an uplink data arrival but no PUCCH resource corresponding to an SR triggered by uplink data.

The transmitting module 1303 is configured to transmit a PDCCH scrambled by the C-RNTI. The PDCCH carries an uplink scheduling grant.

In an example, the trigger event includes an addition of time synchronization for a secondary cell, or a downlink data arrival and the UE being in an uplink out-of-synchronization state.

The transmitting module 1303 is configured to transmit a PDCCH scrambled by the C-RNTI, the PDCCH being used for scheduling downlink transmission; and to transmit a TAC based on the downlink transmission scheduled by the PDCCH.

In an example, the trigger event includes a beam failure recovery.

The transmitting module 1303 is configured to transmit a PDCCH scrambled by the C-RNTI.

Figure 14:
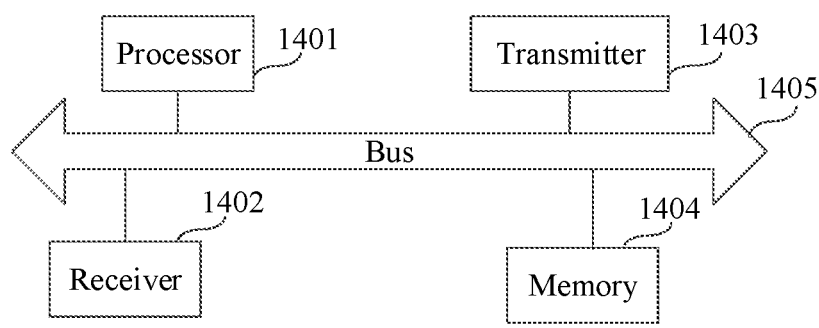
FIG. 14 is a schematic block diagram of a communication terminal (a terminal or an access network device) according to an exemplary embodiment of the present disclosure.

FIG. 14 is a schematic block diagram of a communication terminal (a terminal or an access network device) according to an exemplary embodiment of the present disclosure. The communication terminal includes a processor 1401, a receiver 1402, a transmitter 1403, a memory 1404, and a bus 1405.

The processor 1401 includes one or more processing cores. The processor 1401 executes various functional applications and information processing by running software programs and modules.

The receiver 1402 and the transmitter 1403 can be implemented as one communication component. The communication component can be a communication chip.

The memory 1404 is connected to the processor 1405 via the bus 1401.

The memory 1404 can be used to store at least one instruction. The processor 1401 is configured to execute the at least one instruction, so as to implement each operation in the above method embodiments.

In addition, the memory 1404 may be implemented by any type of volatile or non-volatile storage device or a combination thereof. The volatile or non-volatile storage device includes, but is not limited to, a magnetic disk or an optical disk, an Electrically Erasable Programmable Read-Only Memory (EEPROM), an Erasable Programmable Read-Only Memory (EPROM), a Static Random Access Memory (SRAM), a Read-Only Memory (ROM), a magnetic memory, a flash memory, and a Programmable Read-Only Memory (PROM).

In an exemplary embodiment, a computer-readable storage medium is provided. The computer-readable storage medium stores at least one instruction, at least one segment of a program, a set of codes, or a set of instructions. The at least one instruction, the at least one segment of the program, the set of codes, or the set of instructions is loaded and executed by a processor to implement the method for transmitting/receiving uplink data performed by a communication device according to any of the above method embodiments.

In an exemplary embodiment, a computer-readable storage medium is provided. The computer-readable storage medium stores at least one instruction, at least one segment of a program, a set of codes, or a set of instructions. The at least one instruction, the at least one segment of the program, the set of codes, or the set of instructions is loaded and executed by a processor to implement the power control method of direct communications according to any of the above method embodiments.

It should be understood that the term "a plurality of" mentioned herein refers to two or more. The term "and/or" describes an association relationship between correlated objects, including three relationships. For example, "A and/or B" may mean three situations: A only, B only, or both A and B. In addition, the character "/" generally represents an "or" relationship between the correlated objects preceding and succeeding the symbol.

Other implementations of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary technical means in the art. The specification and embodiments are considered as exemplary only, with a true scope and spirit of the present disclosure being indicated by the claims as attached.

It can be appreciated that the present disclosure is not limited to the exact structure that has been described above and illustrated in the accompanying drawings, and that various modifications and changes can be made without departing from the scope of the present disclosure. The scope of the present disclosure is only limited by the claims as attached.

What is claimed is:

1. A 2-step random access method, comprising:
   transmitting, by a User Equipment (UE), a message A, when a 2-step random access is triggered based on a trigger event, wherein the message A carries a Cell-Radio Network Temporary Identifier (C-RNTI) of the UE;
   receiving, by the UE, a message B; and
   determining, by the UE, that a conflict of the 2-step random access is resolved, when the message B satisfies a condition corresponding to the trigger event,
   wherein the trigger event comprises: Scheduling Request (SR) transmission reaching a failure threshold, and said determining that the conflict of the 2-step random access is resolved, when the message B satisfies the condition corresponding to the trigger event comprises: determining that the conflict of the 2-step random access is resolved, when the UE detects a Physical Downlink Control Channel (PDCCH) scrambled by the C-RNTI in a detection window of the message B and the PDCCH carries an uplink scheduling grant, or
   wherein the trigger event comprises: an addition of time synchronization for a secondary cell, and the PDCCH is used for scheduling downlink transmission, and said determining that the conflict of the 2-step random access is resolved, when the message B satisfies the condition corresponding to the trigger event comprises: detecting, by the UE, a PDCCH scrambled by the C-RNTI in a detection window of the message B; and decoding, by the UE, a third Media Access Control Protocol Data Unit (MAC PDU) based on the downlink transmission scheduled by the PDCCH, wherein the third MAC PDU comprises a fourth MAC Control Element (CE), and the fourth MAC CE carries a Time Alignment Command (TAC); and determining that the conflict of the 2-step random access is resolved.

2. The method according to claim 1, wherein the PDCCH is used for scheduling downlink transmission, and
said receiving the TAC and the uplink scheduling grant based on the PDCCH, and determining that the conflict of the 2-step random access is resolved comprises:
decoding, by the UE, a first MAC PDU based on the downlink transmission scheduled by the PDCCH, wherein the first MAC PDU comprises a first MAC CE, and the first MAC CE carries the TAC and the uplink scheduling grant; and determining that the conflict of the 2-step random access is resolved; or
decoding, by the UE, a second MAC PDU based on the downlink transmission scheduled by the PDCCH, wherein the second MAC PDU comprises a second MAC CE and a third MAC CE, the second MAC CE carries the TAC, and the third MAC CE carries the uplink scheduling grant; and determining that the conflict of the 2-step random access is resolved, wherein the uplink scheduling grant is used for new data transmission.

3. The method according to claim 1, wherein the PDCCH is used for scheduling uplink transmission, and
said receiving the TAC and the uplink scheduling grant based on the PDCCH, and determining that the conflict of the 2-step random access is resolved comprises:
determining, when Downlink Control Information (DCI) decoded by the UE based on the PDCCH carries the TAC and the uplink scheduling grant, that a conflict on a random access channel is resolved,
wherein the uplink scheduling grant is used for new data transmission.

4. A 2-step random access method, comprising:
receiving, by an access network device, a message A, wherein the message A is transmitted by a User Equipment (UE) based on a trigger event;
generating, by the access network device, a message B based on the trigger event of the message A, wherein the message B satisfies a conflict resolution condition corresponding to the trigger event; and
transmitting, by the access network device, the message B,
wherein the trigger event comprises: Scheduling Request (SR) reaching a failure threshold, and said transmitting, by the access network device, the message B comprises: transmitting a Physical Downlink Control Channel (PDCCH) scrambled by a Cell-Radio Network Temporary Identifier (C-RNTI), wherein the PDCCH carries an uplink scheduling grant, or
wherein the trigger event comprises: an addition of time synchronization for a secondary cell, and said transmitting, by the access network device, the message B comprises: transmitting a PDCCH scrambled by a Cell-Radio Network Temporary Identifier (C-RNTI), wherein the PDCCH is used for scheduling downlink transmission; and transmitting a third Media Access Control Protocol Data Unit (MAC PDU) based on the downlink transmission scheduled by the PDCCH, wherein the third MAC PDU comprises a fourth MAC Control Element (CE), and the fourth MAC CE carries a Time Alignment Command (TAC).

5. The method according to claim 4, wherein the method further comprises:
transmitting, by the access network device, a first MAC CE based on the downlink transmission scheduled by the PDCCH, the first MAC CE carrying the TAC and the uplink scheduling grant, or
transmitting, by the access network device, a second MAC CE and a third MAC CE based on the downlink transmission scheduled by the PDCCH, the second MAC CE carrying the TAC, the third MAC CE carrying the uplink scheduling grant.

6. The method according to claim 4, wherein the method further comprises:
transmitting, by the access network device, DCI in the PDCCH, wherein the DCI carries the TAC and the uplink scheduling grant.

7. A communication terminal, comprising:
a processor; and
a transceiver connected to the processor,
wherein the processor is configured to load and execute executable instructions to implement a 2-step random access method comprising:
transmitting a message A, when a 2-step random access is triggered based on a trigger event, wherein the message A carries a Cell-Radio Network Temporary Identifier (C-RNTI) of the UE;
receiving a message B; and
determining that a conflict of the 2-step random access is resolved, when the message B satisfies a condition corresponding to the trigger event,
wherein the trigger event comprises: Scheduling Request (SR) transmission reaching a failure threshold, and said determining that the conflict of the 2-step random access is resolved, when the message B satisfies the condition corresponding to the trigger event comprises: determining that the conflict of the 2-step random access is resolved, when the UE detects a Physical Downlink Control Channel (PDCCH) scrambled by the C-RNTI in a detection window of the message B and the PDCCH carries an uplink scheduling grant, or
wherein the trigger event comprises: an addition of time synchronization for a secondary cell, and the PDCCH is used for scheduling downlink transmission, and said determining that the conflict of the 2-step random access is resolved, when the message B satisfies the condition corresponding to the trigger event comprises: detecting a PDCCH scrambled by the C-RNTI in a detection window of the message B; and decoding a third Media Access Control Protocol Data Unit (MAC PDU) based on the downlink transmission scheduled by the PDCCH, wherein the third MAC PDU comprises a fourth MAC Control Element (CE), and the fourth MAC CE carries a Time Alignment Command (TAC); and determining that the conflict of the 2-step random access is resolved.

8. The communication terminal according to claim 7, wherein the PDCCH is used for scheduling downlink transmission, and
said receiving the TAC and the uplink scheduling grant based on the PDCCH, and determining that the conflict of the 2-step random access is resolved comprises:
decoding a first MAC PDU based on the downlink transmission scheduled by the PDCCH, wherein the first MAC PDU comprises a first MAC CE, and the first MAC CE carries the TAC and the uplink scheduling grant; and determining that the conflict of the 2-step random access is resolved; or
decoding a second MAC PDU based on the downlink transmission scheduled by the PDCCH, wherein the second MAC PDU comprises a second MAC CE and a third MAC CE, the second MAC CE carries the TAC, and the third MAC CE carries the uplink scheduling grant; and determining that the conflict of the 2-step random access is resolved, wherein the uplink scheduling grant is used for new data transmission.

9. The communication terminal according to claim 7, wherein the PDCCH is used for scheduling uplink transmission, and
   said receiving the TAC and the uplink scheduling grant based on the PDCCH, and determining that the conflict of the 2-step random access is resolved comprises:
   determining, when Downlink Control Information (DCI) decoded by the UE based on the PDCCH carries the TAC and the uplink scheduling grant, that a conflict on a random access channel is resolved,
   wherein the uplink scheduling grant is used for new data transmission.

10. A communication device, comprising:
    a processor; and
    a transceiver connected to the processor,
    wherein the processor is configured to load and execute executable instructions to implement the 2-step random access method according to claim 4.

11. The communication device according to claim 10, wherein the method further comprises:
    transmitting a first MAC CE based on the downlink transmission scheduled by the PDCCH, the first MAC CE carrying the TAC and the uplink scheduling grant, or
    transmitting a second MAC CE and a third MAC CE based on the downlink transmission scheduled by the PDCCH, the second MAC CE carrying the TAC, the third MAC CE carrying the uplink scheduling grant.

12. The communication device according to claim 10, wherein the method further comprises:
    transmitting DCI in the PDCCH, wherein the DCI carries the TAC and the uplink scheduling grant.

* * * * *